May 29, 1962 J. HANSEN 3,036,408
APPARATUS FOR MAKING BREAD SLICER BLADES AND THE LIKE
Filed Oct. 16, 1958 3 Sheets-Sheet 1
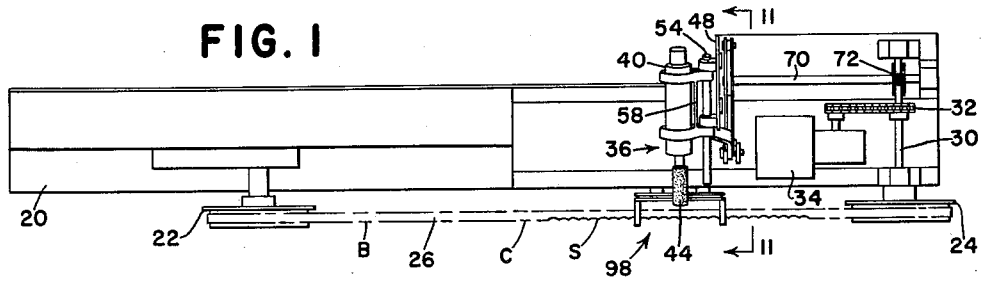
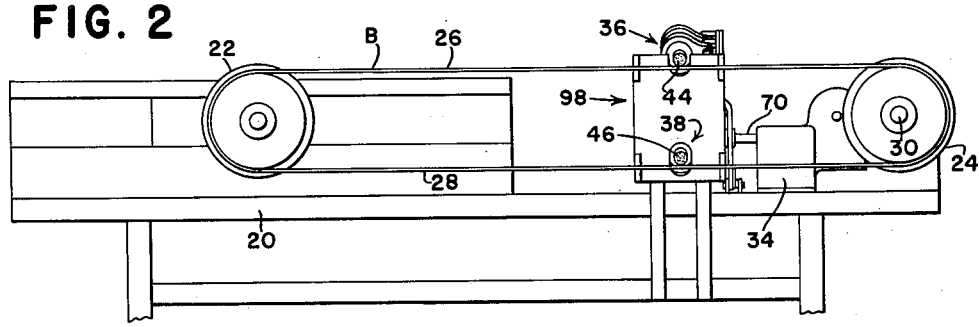
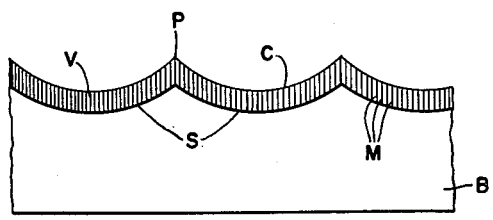
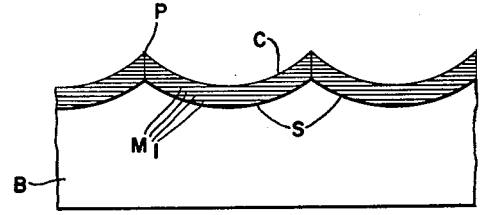
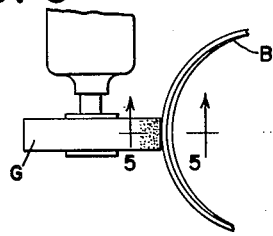
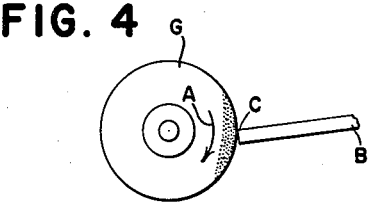
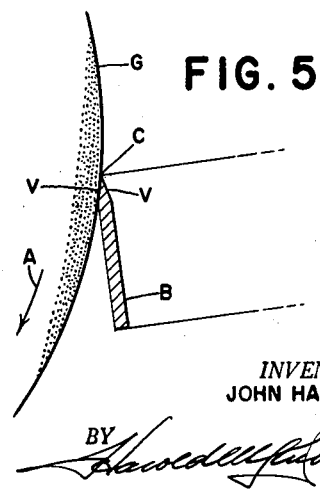
INVENTOR.
JOHN HANSEN
ATTORNEY

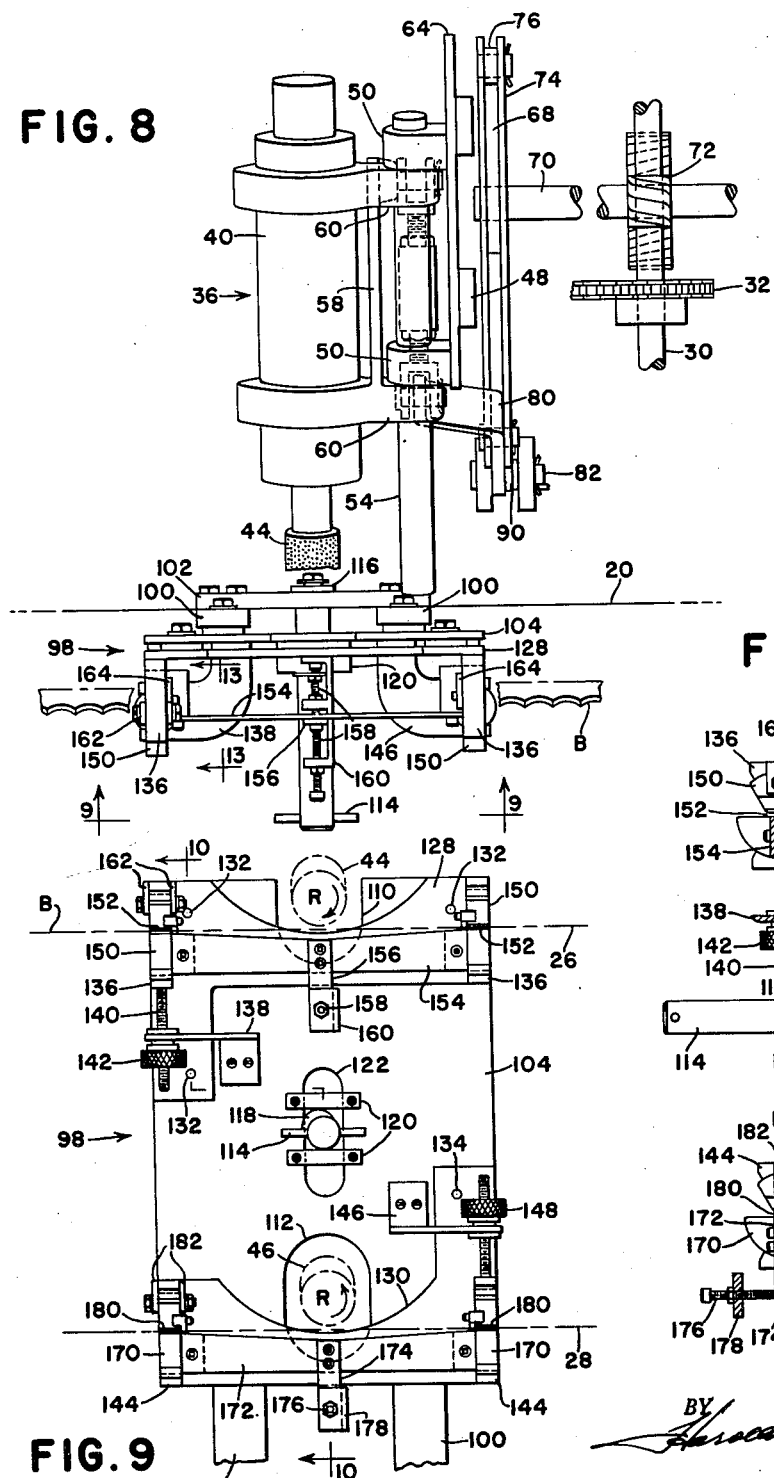
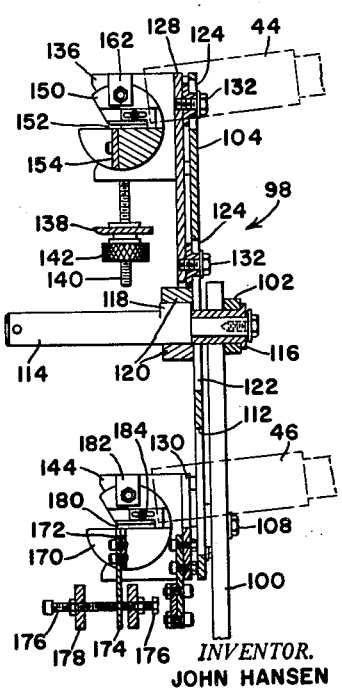

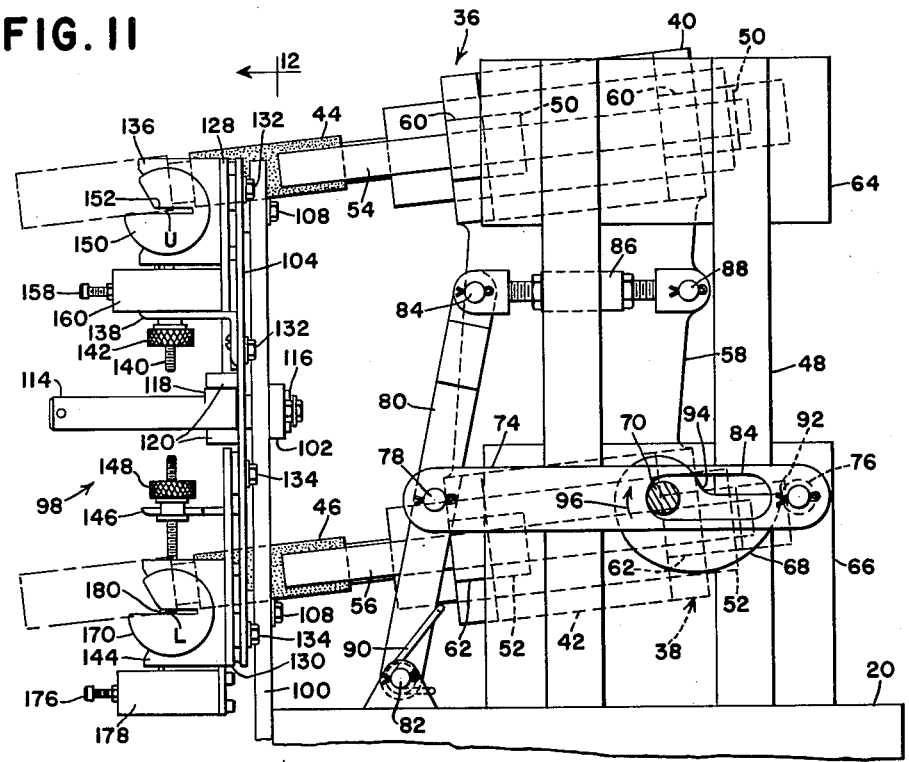
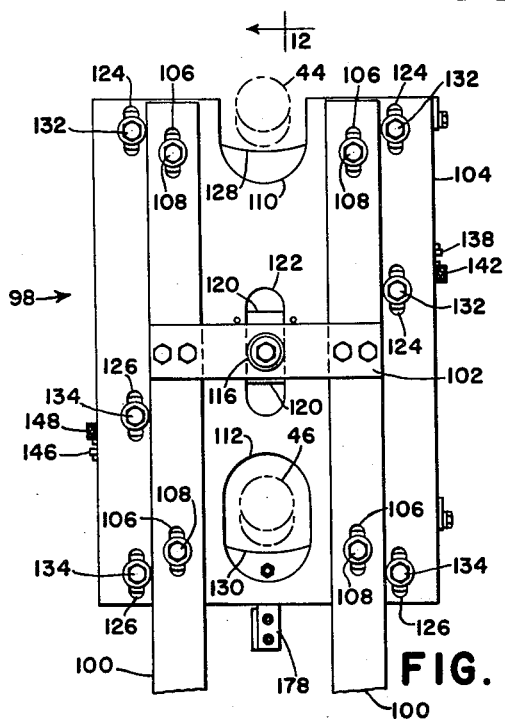
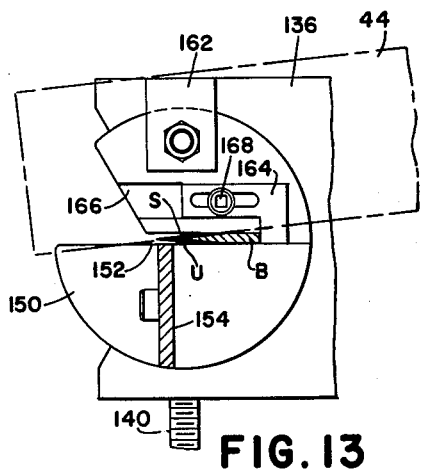

United States Patent Office 3,036,408
Patented May 29, 1962

3,036,408
APPARATUS FOR MAKING BREAD SLICER
BLADES AND THE LIKE
John Hansen, Bettendorf, Iowa
(1533 Rockingham, Davenport, Iowa)
Filed Oct. 16, 1958, Ser. No. 767,744
13 Claims. (Cl. 51—38)

This invention relates to the art of bread slicing, particularly as exploited by commercial bakeries in the production-slicing of loaves by machines employing several endless bands trained about drums and spaced and guided so as to slice a complete loaf in one pass of the loaf through a slicing zone in which the bands present a plurality of high-speed cutting edges comparable in number to the slices into which the particular size and type of loaf is to be cut.

For many years the bakeries and blade manufacturers have relied mainly on the scalloped type of blade disclosed, for example, in the U.S. patents to Hansen 2,002,812 and 2,596,851, first in the reciprocating form and later in the endless or band form. Such blades are formed by a grinding operation which establishes the scallops, which comprise a series of arcuate concave valleys and intervening points or peaks. Because of the nature of the grinding operation, in which the periphery of the grinding wheel for example travels crosswise of the length of the blade, the grinding marks in the scallops are crosswise of the scallops and even though the blade is subjected to subsequent grinding in the manufacture thereof, such as to produce side bevels or the like as in the later Hansen patent noted above, no blade has heretofore been known in which the grinding marks in the scallops are lengthwise of the blade in the initial installation thereof; i.e., before it is used at all. According to the present invention, such blade is now produced by an improved apparatus for manufacturing same. The significance of the change in the direction of grinding lies in the marked improvement in the ability of the blade to travel at higher speeds, to cut softer and warmer loaves without causing "crumbing," "dough balls," "snow" etc. as a result of tearing etc. as experienced in prior blades in many instances, and to render the blades easier to hone. In this respect, it should be appreciated that very minute dimensions are being dealt with and that these consequently become critical, at least from the standpoint of establishing the difference between a mediocre blade and a highly efficient blade.

It is another object of the invention to provide an apparatus whereby blades initially formed by a grinding operation in which the grinding marks are crosswise of the scallops are subjected to a further grinding operation in which said marks are removed and new marks are produced which run lengthwise of the blade. A still further object is to provide such apparatus with blade guide means, grinding wheels rotatable on axes normal to the blade, means for adjusting the grinding angle, means for adjusting the grinding pressure, means for reciprocating the grinding wheels along their axes so as to avoid grooving thereof, and means operative independently of the adjusting means for incurring engagement and disengagement between the blade and the grinding means. The apparatus further features the ability to handle blade bands in belt fashion and to perform the grinding operation on the outside of one run and on the inside of the other run whereby both sides of the band are ground at the same time.

The foregoing and other important objects and desirable features inherent in and encompassed by the invention will become apparent as a preferred embodiment of the invention is set forth by way of example in the ensuing description and accompanying sheets of drawings, the several figures of which are described below.

FIGURE 1 is a general plan view of the improved apparatus.
FIGURE 2 is a general front view of the apparatus shown in FIGURE 1.
FIGURE 3 is a plan view of a portion of a machine and blade and illustrating one manner of initially forming scallops in the cutting edge of the blade.
FIGURE 4 is an elevation of the same.
FIGURE 5 is an enlarged section on the line 5—5 of FIGURE 3.
FIGURE 6 is an enlarged elevation of a scalloped blade as formed by the method and apparatus of FIGURES 3–5.
FIGURE 7 is a view of the blade after performance of the grinding operation by the apparatus and method of FIGURES 1 and 2.
FIGURE 8 is an enlarged plan, with portions broken away, of the major control, guide, grinding and regulator components of the apparatus of FIGURES 1 and 2.
FIGURE 9 is a front view as seen on the line 9—9 of FIGURE 8.
FIGURE 10 is a section on the line 10—10 of FIGURE 9.
FIGURE 11 is an end view, partly in section, as seen on the line 11—11 of FIGURE 1.
FIGURE 12 is a rear view as seen on the line 12—12 of FIGURE 11.
FIGURE 13 is an enlarged section on the line 13—13 of FIGURE 8.

Reference will be had first to FIGURES 3–6 for a basic explanation of the environmental aspects of the invention. The letter B in these figures represents the blade stock or strip material, preferably of steel and having opposite flat sides and straight opposite edges to begin with, and, after the process of FIGURES 3, 4 and 5, one of the edges becomes a sharpened scalloped cutting edge C characterized by a series of arcuate scallops or valleys S and alternate points or peaks P. The first-mentioned Hansen patent illustrates one method of achieving the cutting edge and FIGURES 3–5 are based on that disclosure. A grinding wheel G cuts the scallops as the blade strip is held against the wheel in arcuate form and slightly non-tangent to the wheel and the strip is indexed lengthwise thereof by suitable means (not shown) to afford scallops of the desired length, depth and pitch. As shown in FIGURE 5, the grinding is done from opposite sides along the edge that becomes the cutting edge C so that the scallops are beveled or sharpened at opposite sides as at V, V. Since the grinding wheel G rotates about the designated axis, its periphery travels consequently transverse to the length of the blade (arrow A) and the grinding marks left on each side V of the scallops are transverse to the length of the blade, as shown at M in FIGURE 6, which is enlarged over the actual size of a typical blade. Although the first-mentioned Hansen patent discloses this process and apparatus in conjunction with the manufacture of an older form of reciprocating blade, the same may be and is, in refined form, applied to the manufacture of endless band blades such as are used today by commercial bakeries. Such band is shown in FIGURES 1 and 2 and may be implied in the other figures, still designated B for clarity but ultimately subjected to further processing so that the transverse grinding marks M (FIGURE 6) are removed and replaced with grinding marks $M_1$ that run parallel to or lengthwise of the band, giving the pronouncedly significant results noted above. See FIG. 7.

The apparatus for performing this second operation comprises basic support means 20 having means for carrying the endless band B via a pair of rotatable wheels 22 and 24 appropriately journaled on the means 20, and the wheel 22 is adjustable as to position by any suitable means (not shown) for accommodating bands of different sizes as well as for properly tensioning the band so as to present what may be termed upper and lower runs 26 and 28. At this point, it should be noted that the arrangement shown is preferred, with the runs horizontal and the cutting edge C forwardmost so that, when the wheels 22 and 24 turn, the runs travel in upper and lower horizontal paths; although, the apparatus may be otherwise arranged if desired. Hence, such expressions as "upper," "rear," "lower," "front" etc. should be taken as illustrative and not limiting. The wheel 24 is keyed to a drive shaft 30 which is powered by a chain and sprocket drive 32 from an electric motor and gear reduction means 34, by way of example. The band thus moves relative to upper and lower grinding means 36 and 38; although, the grinding means could of course be moved relative to the band as an equivalent. These grinding means respectively include housings 40 and 42 in which are enclosed small high-speed electric motors (not shown) for driving upper and lower cylindrical grinding elements or spindles 44 and 46, respectively, which operate respectively on the top or uppermost flat sides of the upper and lower runs 26 and 28 of the band B, whereby both sides of the band are ground at the same time to produce the band of which a portion is shown in FIGURE 7, having the grinding marks $M_1$ parallel to the length of the band at both sides V, V of the scallops S. The simultaneous operation occurs because the top side of the upper run becomes the bottom side of the lower run and vice versa.

As best shown in FIGURE 11 for example, each grinding means is mounted so that the axis of rotation of its grinding spindle lies in a plane normal to the length of the band but is inclined upwardly and rearwardly in that plane, here on the order of 6° to the horizontal, which is the angle ground at V, V when the scallops are initially formed by the apparatus of FIGURES 3–5, but in FIGURES 1 and 2, the grinding operation involves the rotation of the spindles 44 and 46 about the aforesaid axes so that their peripheries travel lengthwise of the band (arrows R, FIGURE 9), producing the grinding marks $M_1$ as aforesaid. The mounting of the upper and lower grinding means is effected by an upright mount or frame 48 having a pair of upper apertured ears 50 and a pair of similar lower ears 52, and these ears respectively rigidly mount upper and lower slide rods 54 and 56. The housings 40 and 42 of the upper and lower grinding means are interconnected or rigidly webbed together as by a web or flange 58 and these housings respectively have upper bearings 60 and lower bearings 62 slidably received by the rods, respectively, so that the two housings as a unit are capable of reciprocation, within limits (dotted lines, FIGURE 11), along the path established by the inclination of the rods, which are parallel to the respective axes of rotation of the grinding spindles 44 and 46. The mount 48 may include upper and lower plates 64 and 66 on which the rod-mounting ears 50 and 52 are rigidly mounted.

The grinding spindles 44 and 46 are made long enough to accommodate reciprocation of the aforesaid unit without losing contact with the band, the purpose of the reciprocation being to avoid the wearing of grooves in the spindles which would occur were their positions fixed relative to the traveling blade B. Reciprocation is achieved by a cam 68 keyed or otherwise fixed to a shaft 70 that is driven by helical gears 72, for example, from the wheel shaft 30. A pair of drive links 74 straddles the cam and at one end carries a cam follower or roller 76 and at the opposite end is pivotally connected at 78 to a swingable arm 80 having a fulcrum at 82 on the support means 20. Each link 74 is slotted at 84 to receive the cam shaft 70 for purposes of guiding the links as the cam turns with the cam shaft. The upper portion of the arm 80 may be offset as shown to effect a pivotal connection at 84 with an adjustable link 86 which is in turn pivotally connected at 88 to the web 58 that joins the grinding means housings 40 and 42. A torsion spring 90 is shown as representative of means for urging the arm 80 forwardly (to the left as seen in FIGURE 11) as the roller 76 drops off the high part 92 of the cam to its low part 94, the cam rotating in the direction of the arrow 96 (FIGURE 11). Thus, the grinding means move forwardly rapidly under the influence of the spring 90, or equivalent means, and are returned relatively slowly by the cam 68, the housing unit sliding freely on the rods 54 and 56, and since these rods are inclined in accordance with the axes of the spindles there is no change in the grinding angle.

The upper and lower runs of the band are guided, controlled, adjusted and regulated by a regulator assembly designated in its entirety at 98. This assembly is mounted on the support means 20 preferably via a pair of upright bars 100 rigidly cross-connected by a cross bar 102, and includes an upright plate 104 having a front face disposed closely behind the band runs 26 and 28. The bars 100 are vertically slotted at 106 (FIGURE 12) and appropriately bushed cap screws 107 are received in the back of the plate 104, passing respectively through the slots 106 to carry the plate on the bars for relative vertical movement between upper and lower positions. The plate 104 is suitably cut out at 110 and 112 to receive the upper and lower grinding spindles 44 and 46, respectively. The two positions of the plate are achieved by a manually operated selector handle 114 which has its rear concentric end journaled at 116 in the cross bar 102 and which is formed with a cam or eccentric 118 operative between upper and lower blocks 120 rigid on the plate 104, whereby turning of the handle 114 changes the position of the eccentric and selectively raises or lowers the plate 104, the purpose of which will presently appear. A vertical slot 122 in the plate accommodates the handle 114 and its mounting.

The plate 104 is formed with a set of upper slots 124, here three in number, and a symmetrical set of lower slots 126 (FIGURE 12) by means of which the plate vertically adjustably mounts upper and lower guide carriers 128 and 130. Each carrier is adjustable independently of the other and for this purpose the upper carrier receives a plurality of suitably bushed cap screws 132 which pass respectively through the upper carrier slots 124, and similar means at 134 pass through the lower set of slots 126 for mounting the lower carrier 130. The upper carrier 128 is preferably L-shaped as shown and the transverse leg thereof carries a pair of horizontally spaced bearings 136 and the upright leg thereof depends alongside a bracket 138 rigid on the plate 104. An adjusting screw 140 is threaded into a knurled knob and collar 142 which is rotatably but non-axially movably received by the bracket 138 and this screw engages the carrier 128 at one of the bearings 136 so that turning of the knob propels or retracts the screw 140 to elevate or lower the carrier 128. A similar construction is repeated for the lower carrier 130, the transverse leg of which has horizontally spaced bearings 144 and the vertical leg of which lies proximate to a plate-carried bracket 146 which mounts a collared adjusting knob and screw arrangement 148 like that at 140—142.

The upper bearings 136 are interiorly partly cylindrical about a common horizontal axis U and a similar relationship exists in the lower bearings 138 about a common lower axis L. Each upper bearing concentrically carries a blade guide 150, horizontally rearwardly slotted at 152 to receive the upper band run 26, the two guides thus guiding this run at portions thereof spaced lengthwise thereof. The tension on the band between the wheels 22 and 24 is such as to allow a limited amount of vertical flexing to the band portion between the guides. Since the guides are cylindrical except for their slots 152 and suitable mouths to provide easy access to said slots, they are rockable about the upper axis U, and a cross bar 154 interconnects the guides so that they are rockable in unison. The bar 154 rigidly carries centrally thereof a depending leg 156 which is opposed by front and rear fore-and-aft adjusting screws 158 carried by a bracket 160 rigid on the plate 104, whereby selective rocking of the guides as a unit may be achieved by turning the screws and retained by locking the screws so as to vary and retain the angle of the blade to the upper grinding spindle 44, since rocking of the guides changes the angle of the slots 152 to the spindle. This permits setting and adjustment of the blade according to the angle at which the scallop bevels V, V have been previously ground. The guides are retained against endwise displacement in the bearings 136 as by clips 162. The depth to which the blade may be received in each slot 152 is regulated by an adjustable abutment 164 received in a groove 166 in the guide and retained by a screw 168. As best shown in FIGURE 13, these abutments are set so that the bottoms of the scallops S on the cutting edge C of the blade lie on the axis U.

The above construction is repeated on the lower carrier via guides 170 mounted in the lower carrier bearings 144 and joined by a cross bar 172 from which an arm 174 depends to cooperate with adjusting screws 176 carried by a lower bracket 178 mounted on the front face of the plate 104. The lower guides are slotted at 180 to receive the lower run 28 of the band and the angle of these slots and consequently of the lower run portion 28 may be independently adjusted. Clips 182 like those at 162 retain the lower guides and cross bar assembly against axial displacement relative to the lower carrier bearings 144, and blade stops or abutments 184, like those at 164, are provided for the lower guides.

In operation, the band is trained about the wheels 22 and 24 and appropriately tensioned, the upper and lower run portions 26 and 28 being received by the upper and lower guide slots 152—152 and 180—180 respectively with the portions of the runs between the respective guides being capable of vertical flexing to enable the sides V, V of the scallops S to maintain contact with the respective grinding spindles 44, 46. The selector handle 114 is turned to elevate the plate 104 to its upper position so that the runs 26 and 28 respectively engage the grinding spindles 44 and 46, which at this time are idle. The carriers 128 and 130 are individually adjusted as to height by the respective adjusting means 142 and 148 and the guides 150, 150 and 170, 170 are individually adjusted as to angle by the adjusting means 158—158 and 176—176. The motor 34 is energized to drive the wheels 22 and 24 and the band B as well as the grinding means reciprocating mechanism (cam 68, etc.), and the spindle motors are likewise energized to rotate the spindles. Hence, the upper and lower runs 26 and 28 of the band move continuously as the grinding spindles 44 and 46 rotate as well as reciprocate. The selector handle may be turned to the low part of its eccentric 118 to lower the entire plate 104 and the components carried thereby, which of course includes the upper and lower blade guides 150—150 and 170—170, thus disengaging the band runs from the spindles 44 and 46, all without affecting the adjustments previously achieved via the adjusting means 142, 148, 158—158 and 176—176.

When blades of different widths are ground, the adjustable abutments accommodate the differences, enabling the retention of coincidence between the line of the bottoms of the scallops S and the respective axes U and L. The apparatus is compact, easy to use, affords extreme adjustability and flexibility because of the various independent adjustments, and lends itself to the performance of the method whereby a blade is produced having a scalloped cutting edge in which the grinding marks, as at $M_1$, FIGURE 7, are lengthwise of or parallel to the length of the band, which band has the improved performance characteristics already noted. In view of the present disclosure, widely different components will readily suggest themselves for achieving comparable results, but these are deemed to fall within the scope of the invention.

What is claimed is:

1. Apparatus for the manufacture of bread slicer blades from elongated relatively thin strip material having opposite flat sides and opposite edges, comprising: support means; means on the support means for carrying the strip to move lengthwise in a horizontal path with one of its sides uppermost and one of its edges forwardmost; an upright regulator plate disposed behind the strip and having a front face paralleling the strip; means mounting the plate on the support means; a pair of strip guides spaced apart lengthwise of the strip and ahead of the plate and respectively having horizontally alined slots receiving and guiding the strip; a carrier extending between the guides and mounted on the plate for vertical adjustment; means mounting the guides on the carrier for vertical adjustment with the carrier and also for adjustment relative to the carrier and as a unit about a horizontal axis paralleling the strip and passing through the guide slots; grinding means carried by the support for rotation about an axis normal to the length of the strip and intermediate the guides to engage the guided strip from above so as to grind a portion of the uppermost side of the strip; first adjusting means for adjusting the guides about said horizontal axis so as to vary the angle of the strip to the grinding means; and second adjusting means for adjusting the carrier vertically relative to the plate for varying the degree of engagement between the strip and the grinding means.

2. The invention defined in claim 1, in which: the means mounting the plate on the support means includes provision for relative vertical movement of the support; and selector means is operative between the support means and the plate for moving the plate between an upper position in which the strip engages the grinding means and a lower position in which the strip is disengaged from the grinding means.

3. The invention defined in claim 1, in which: the axis of rotation of the grinding means is inclined upwardly and rearwardly and the grinding means is cylindrical about that axis so as to grind said uppermost side of the strip along the forwardmost edge of the strip.

4. The invention defined in claim 3, in which: the grinding means is mounted for reciprocation along said axis of rotation; and the support means carries means connected to and for reciprocating the grinding means.

5. Apparatus for the manufacture of bread slicer blades from elongated relatively thin strip material having opposite flat sides and opposite edges and initially formed into an endless band; support means; means on the support means for carrying the band in belt-fashion to present an upper horizontal run moving in one direction and a lower horizontal run moving in the opposite direction, with each run having an uppermost flat side and a forwardmost edge; an upright regulator plate disposed behind the runs and having a front face paralleling the runs; means mounting the plate on the support means; a pair of upper run guides spaced apart lengthwise of the upper run and ahead of the plate and respectively having horizontally alined slots receiving and guiding the upper run; a pair of lower run guides spaced apart lengthwise of and respectively having slots receiving and guiding the lower run and disposed ahead of the plate; upper and lower carriers individually mounted on the plate for vertical adjustment; upper and lower means mounting the guides respectively on the upper and lower carriers for individual adjustment of each pair of guides as a unit about a horizontal axis paralleling the respective run and passing through the respective slots; upper and lower grinding means carried by the support for rotation respectively about upper and lower axes respectively normal to the lengths of the runs and intermediate the respective guides to engage the respective runs from above for grinding a portion of each run at its uppermost side; first upper and lower adjusting means for adjusting the upper and lower guides respectively and individually about their horizontal axes so as to vary the angle of each run to its grinding means; and second upper and lower adjusting means for respectively and individually adjusting the upper and lower carriers vertically relative to the plate for varying the degree of engagement between the respective runs and their grinding means.

6. The invention defined in claim 5, in which: the means mounting the plate on the support means includes provision for relative vertical movement of the support; and selector means is operative between the support means and the plate for moving the plate between an upper position in which both runs respectively engage the upper and lower grinding means and a lower position in which both runs are respectively disengaged from the upper and lower grinding means.

7. The invention defined in claim 5, in which: the axis of rotation of each grinding means is inclined upwardly and rearwardly and each grinding means is cylindrical about that axis so as to grind the uppermost side of the respective run along the forwardmost edge of said run.

8. The invention defined in claim 7, in which: each grinding means is mounted for reciprocation along its axis of rotation; and the support means carries means connected to and for reciprocating the grinding means in unison.

9. Apparatus for the manufacture of bread slicer blades from elognated relatively thin strip material having opposite flat sides and opposite edges, comprising: support means; means on the support means for carrying the strip to move lengthwise in a horizontal path with one of its sides uppermost and one of its edges forwardmost; an upright regulator plate disposed behind the strip and having a front face paralleling the strip; means mounting the plate on the support means; a pair of strip guides spaced apart lengthwise of the strip and ahead of the plate and respectively having horizontally alined slots receiving and guiding the strip; a carrier extending between the guides and mounted on the plate for vertical adjustment; means mounting the guides on the carrier for vertical adjustment with the carrier; grinding means carried by the support means for rotation about an axis normal to the length of the strip and intermediate the guides to engage the guided strip from above so as to grind a portion of the uppermost side of the strip; and adjusting means for adjusting the carrier vertically relative to the plate for varying the degree of engagement between the strip and the grinding means.

10. The invention defined in claim 9, in which: the means mounting the plate on the support means includes provision for relative vertical movement between the plate and the support means; and selector means is operative between the support means and the plate for moving the plate between an upper position in which the strip engages the grinding means and a lower position in which the strip is disengaged from the grinding means.

11. Apparatus for the manufacture of bread slicer blades from elongated relatively thin strip material having opposite flat sides and opposite edges, wherein one of said edges is thinned out to a cutting edge having a series of scallops formed therein by a grinding operation leaving grinding marks on said scallops running normal to the length of the strip, comprising: support means; means on the support means for carrying the strip; grinding means on the support means and engageable with the strip at one side thereof and along said cutting edge and including a grinding element rotatable about an axis normal to the length of the strip; means for moving the grinding means and strip relatively along a path parallel to the cutting edge while said element rotates so as to remove the aforesaid grinding marks from the scallops and to produce in the scallops grinding marks parallel to the length of the strip; guide means for holding the strip in relation to the grinding means; and adjustable means between the support means and guide means for adjusting the latter to vary the angle of said one side of the strip to the grinding element.

12. Apparatus for the manufacture of bread slicer blades from elongated relatively thin strip material having opposite flat sides and opposite edges, wherein one of said edges is thinned out to a cutting edge having a series of scallops formed therein by a grinding operation leaving grinding marks on said scallops running normal to the length of the strip, comprising: support means; means on the support means for carrying the strip; grinding means on the support means and engageable with the strip at one side thereof and along said cutting edge and including a grinding element rotatable about an axis normal to the length of the strip; means for moving the grinding means and strip relatively along a path parallel to the cutting edge while said element rotates so as to remove the aforesaid grinding marks from the scallops and to produce in the scallops grinding marks parallel to the length of the strip; guide means for holding the strip in relation to the grinding means; and compound adjustable means between the support means and guide means for adjusting the latter to vary both the degree of engagement between the strip and the grinding element and also the angle of said one side of the strip to the grinding element.

13. Apparatus for the manufacture of bread slicer blades from elongated relatively thin strip material having opposite flat sides and opposite edges, comprising: support means; means on the support means for carrying the strip to move lengthwise in a horizontal path with one of its sides uppermost and one of its edges forwardmost; a pair of strip guides spaced apart lengthwise of the strip and respectively having horizontally alined slots receiving and guiding the strip; a carrier extending between the guides and mounted on the support means for vertical adjustment; means mounting the guides on the carrier for vertical adjustment with the carrier; grinding means carried by the support means for rotation about an axis normal to the length of the strip and intermediate the guides to engage the guided strip from above so as to grind a portion of the uppermost side of the strip; and adjusting means for adjusting the carrier vertically relative to the support means for varying the degree of engagement between the strip and the grinding means.

References Cited in the file of this patent

UNITED STATES PATENTS

| Number | Name | Date |
|---|---|---|
| 338,301 | Renshaw et al. | Mar. 23, 1886 |
| 396,553 | Fowle | Jan. 22, 1889 |
| 1,250,377 | Stevens | Dec. 18, 1917 |
| 1,480,627 | Muller | Jan. 15, 1924 |
| 1,907,446 | Schick et al. | May 9, 1933 |
| 1,921,039 | Remington | Aug. 8, 1933 |
| 2,183,995 | Mautz | Dec. 19, 1939 |
| 2,680,940 | Hill et al. | June 15, 1954 |
| 2,725,698 | Hill | Dec. 6, 1955 |
| 2,757,697 | Simmons et al. | Aug. 7, 1956 |
| 2,827,091 | Metz | Mar. 18, 1958 |